United States Patent

[11] 3,556,503

[72] Inventor John H. van Moss, Jr.
Highland, Ill.
[21] Appl. No. 767,450
[22] Filed Oct. 14, 1968
[45] Patented Jan. 19, 1971
[73] Assignee Vanguard Corporation
a corporation of Illinois

[54] SIDE BEARING FOR RAILROAD CARS
8 Claims, 8 Drawing Figs.
[52] U.S. Cl. .................................................. 267/3,
267/1
[51] Int. Cl. ................................................... F16f 1/36
[50] Field of Search .......................................... 267/3, 6,
152, 153; 105/197, 197.1

[56] References Cited
UNITED STATES PATENTS
3,035,825   5/1962   Weller .......................... 267/1(52)
3,045,998   7/1962   Hirst ............................. 267/3

Primary Examiner—James B. Marbert
Attorney—Rummler & Snow

ABSTRACT: A preloadable side bearing for railroad cars having a mass of hard elastomeric material on a base adapted for attachment to a supporting surface, such as the truck bolster of a railroad car with provision for an initial reduction in the overall height of the bearing in response to preloading forces and to then absorb substantial loading forces with resulting compressive depression of the mass and wherein the mass is formed of a material such as polyurethane.

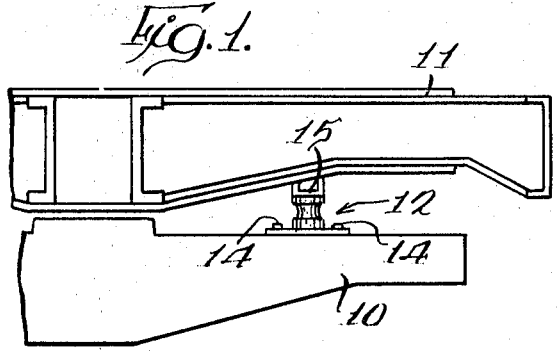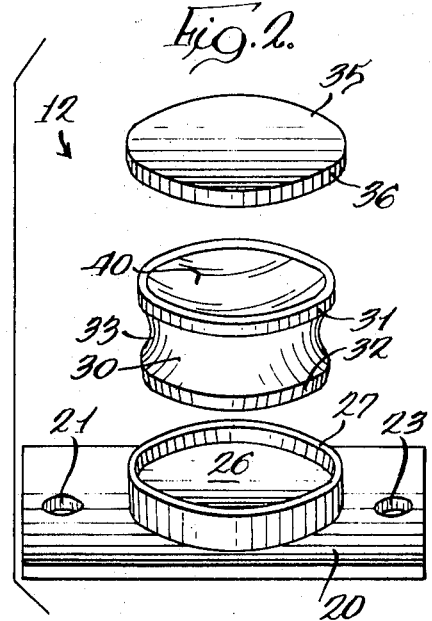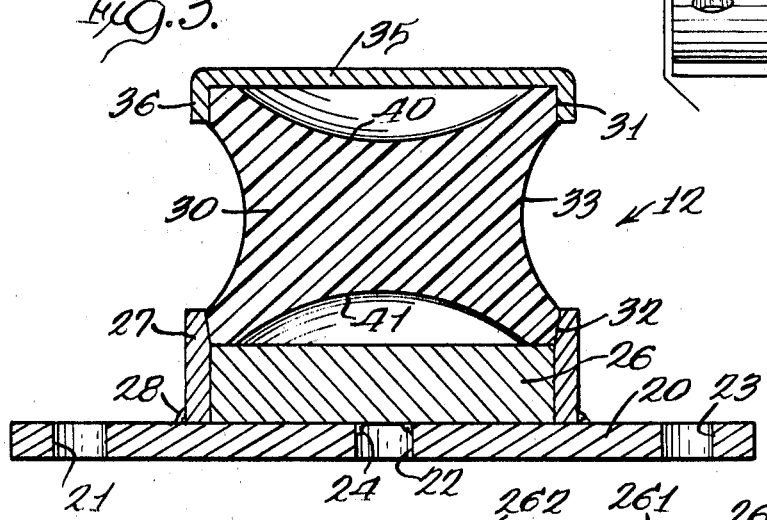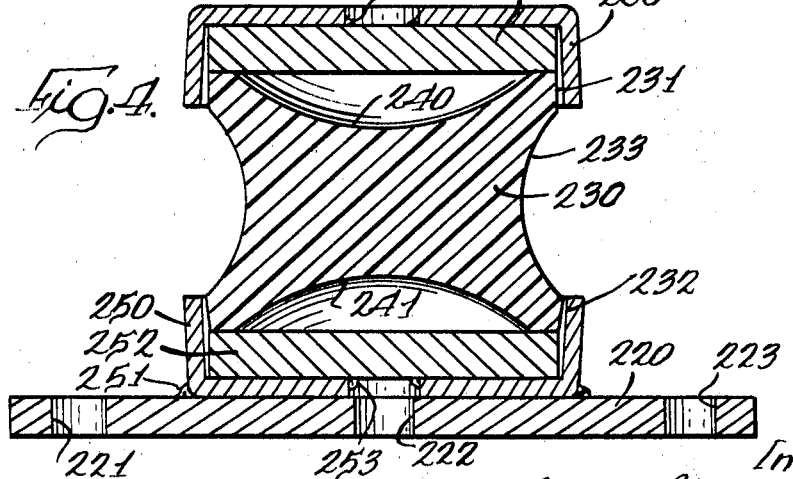

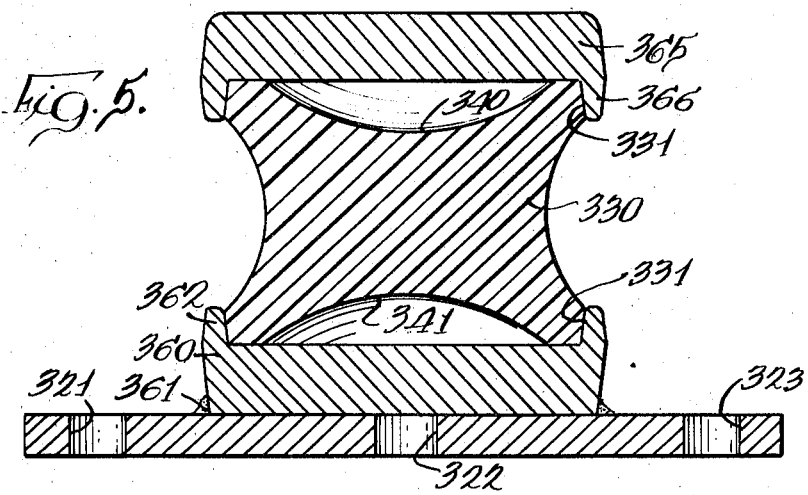
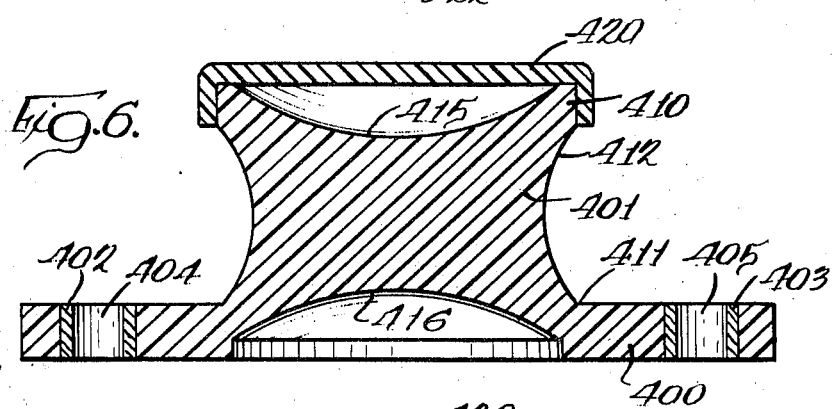
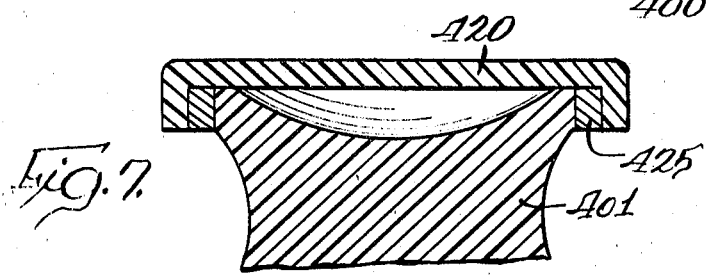
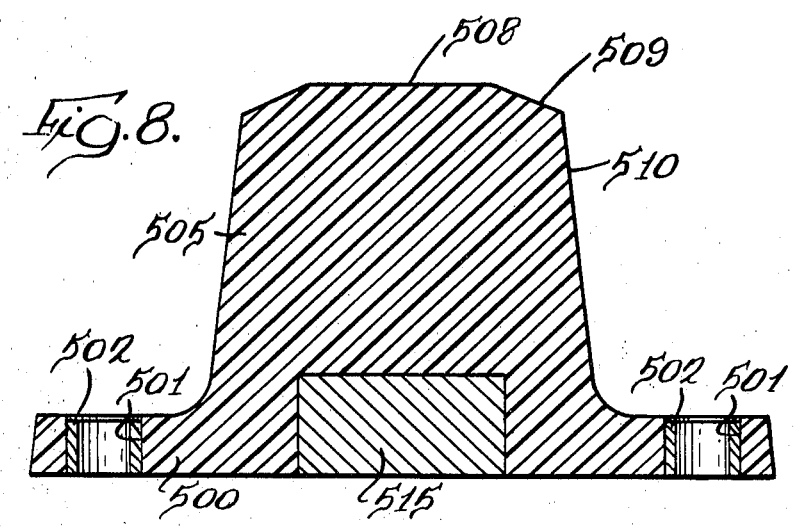

3,556,503

SIDE BEARING FOR RAILROAD CARS

BACKGROUND OF THE INVENTION

This invention relates to a preloadable side bearing for use with railroad cars and for positioning between the car body and a truck bolster to be compressed under preloading forces and receive forces encountered as the car body swings to reduce harmonic rocking of the car body and resultingly reduce the frequency of derailments.

Side bearings have been known for many years embodying rollers movably mounted in a frame supported on a truck bolster which could be contacted by the car body. Also, preloaded side bearings are known utilizing spring-loaded cam systems resulting in a complicated construction. Insofar as solving the problem of harmonic rocking motion resulting in derailments, it has been known to utilize snubber members used in conjunction with the spring groups between the truck bolster and the side frame of the truck. None of the foregoing, as well as other variations thereof, have been found to provide an inexpensive structure which will reduce the harmonic condition which causes the car bodies to sway from side to side and created a problem which is known in the railroad industry as "rock and roll." More specifically, this condition has been encountered with high covered hopper cars and some high side gondolas capable of carrying between 100 and 125 tons of material. These cars are normally approximately the same length as the standard rail and with the staggered joints between the rails, the harmonic condition was set up at some of the lower speeds of travel.

As now understood, this swinging of the car body from one side to the other contacted against the side bearing which is located between the car body and the truck bolster. The forces were transmitted through the bolster and into the spring group and the side frame of the truck. From there, the force went through the car journals and onto the axles on the outboard side of the wheels of the truck. This caused the wheels and the rail on that particular side to form a fulcrum point and the axles and wheels rotated about that fulcrum point, lifting the wheel from the track on the opposite side. This has not been a new condition. However in the past, most of the time the wheels on the far side returned and made contact with the rail. In these newer cars with larger loads and greater frequency of the harmonic condition, the wheels were returning to the level and missing the rail, causing derailments. A second condition which is causing derailments is believed to be where the harmonic rocking of the car body becomes so violent that the loads transmitted down through the truck bolsters and frame into the wheels are great enough to actually turn the rail over.

At the present time, there are no firm specifications by the Association by American Railroads regarding resilient-type side bearings; however, it has been decided informally that such side bearings should have an initial preload of 5,000 lbs. on each side of the car, with a deflection of the resilient side bearing of approximately ¼ inch and as the car body rocks the resistance of the side bearing should increase to 50,000 lbs. with an additional deflection of approximately 1 inch. The side bearing disclosed herein substantially meets the foregoing informal specifications and contributes to a reduction of the problems which have resulted in derailments.

SUMMARY

An object of this invention is to provide a new and improved preloadable side bearing for use with railroad cars which reduces the likelihood of derailment in a railroad car.

Another object of the invention is to provide a preloadable side bearing for positioning between the frame of a railroad car and the truck bolster comprising a base member attachable to the truck bolster, a symmetrically shaped mass of hard elastomeric material extending upwardly from the base with the periphery thereof being shaped to permit outward movement of the material without significantly increasing the overall dimension of the mass of material.

Still another object of the invention is to provide a preloadable side bearing as defined in the preceding paragraph wherein the upper and lower ends of the mass of elastomeric material are outwardly concave to permit initial compression of the bearing with an initial preloading force without requiring substantial compression of the entire mass of material.

Still another object of the invention is to provide a preloadable side bearing, wherein the base member and shaped mass of elastomeric material are formed integrally of the same material.

An additional object of the invention is to provide a preloadable side bearing, as defined in the preceding paragraph and a combination thereof with a railroad car, wherein said elastomeric material has a hardness of approximately 50Shore D Scale or harder and provides an initial deflection of the side bearing of approximately ¼ inch under 5,000 lbs. loading and limits additional deflection to approximately 1 inch under additional loading of approximately 50,000 lbs.

A further object is to have a wear member in the form of a cap also formed of the elastomeric material and fitted over the mass and with particles of material, such as Teflon, embedded therein to provide a slippery surface for the wear member.

Further objects and advantages will become apparent from the following detailed description taken in connection with the accompanying drawings.

DESCRIPTION OF THE DRAWING

FIG. 1 is a fragmentary, simplified elevational view of a portion of a railroad car body and truck bolster with the novel side bearing positioned therebetween;

FIG. 2 is an exploded view of one embodiment of the side bearing;

FIG. 3 is a vertical central section of the assembled side bearing shown in exploded view in FIG. 2;

FIG. 4 is a vertical central section through a second embodiment of the side bearing;

FIG. 5 is a vertical central section of a third embodiment of the side bearing;

FIG. 6 is a central vertical section of a fourth embodiment of the side bearing;

FIG. 7 is a partial central vertical section of a modification of the fourth embodiment; and FIG. 8 is a central vertical section of a preferred embodiment of the side bearing.

DESCRIPTION OF THE EMBODIMENTS

While this invention is susceptible of embodiment in many different forms, there is showing in the drawings and will be described herein in detail a preferred embodiment of the invention together with modifications thereof with the understanding that the present disclosure is to be considered as an exemplification of the principles of the invention and is not intended to limit the invention to the embodiments illustrated. The scope of the invention will be pointed out in the appended claims.

In order to illustrate the utilization of the side bearing and the combination, the associated components of a railroad car are showing therewith in FIG. 1, wherein a truck bolster 10 underlies the car frame 11 of the car body and with the preloaded side bearing indicated generally at 12 disposed therebetween and attached to the truck bolster 10 by bolts 14 and with the upper surface thereof in engagement with a plate 15 secured to the underside of the car frame 11. When the car frame is assembled to the truck bolster, the parts are interfitted with the frame resting on the center plate of the truck bolster and with the height of the side bearing 12 designed to provide for an initial deflection under a predetermined loading. As mentioned previously, the informal specifications, at this time, specify that an initial contact load of 5,000 lbs. will result in a deflection of the side bearing of approximately ¼ inch.

The first embodiment of the side bearing 12 is shown in FIGS. 2 and 3 and includes parts formed as weldments, including base member 20 having a series of openings 21, 22, and 23 extending therethrough, with the openings 21 and 23 providing for passage of attachment bolts 14 therethrough and with the opening 22 permitting access for welding a weld 24 to the underside of a spacer plate 26 resting upon the upper face of the base member 20. An annular member 27 surrounds the spacer member 26 and is welded to the base member as indicated at 28 and has an annular upstanding flange extending upwardly beyond the spacer member. The annular member and spacer 26 together define a well for receiving a symmetrical mass 30 of hard elastomeric material forming the resilient component of the side bearing. This mass has a somewhat cylindrical shape, but is especially contoured to provide a polyrate polynomial spring which is a solid, nonlinear spring having the desired spring rate and resulting in a force-displacement curve defined by a polynomial. The shape of the spring can be described by a polynomial of revolution. The mass 30 has a side surface with an upper perimetral part 31 and a lower perimetral part 32 and with an outwardly concave section 33 therebetween. The lower perimetral part 32 fits within the well defined by the annular member 27 and spacer 26 and with the periphery thereof engaging against the inner side of the annular flange 27.

A wear member is positioned on the top surface of the mass 30 and, as shown in FIGS. 2 and 3, embodies an inverted cup 35 having a depending peripheral flange 36 which surrounds and fits against the upper perimetral part 31 of the mass. In the embodiment of FIGS. 2 and 3, all of the parts, except for the mass 30, are formed of suitable metal structure to provide the desired strength and wear characteristics.

The outwardly concave section 33 of the elastomeric mass 30 contributes to the desired compression under loading of the side bearing and also functions to avoid bulging of the mass 30 outwardly beyond the diameter of the perimetral parts 31 and 32 under expected loads. Also, substantial radial loading on the perimetral parts 31 and 32 is avoided to avoid substantial outward forces on the flanges 27 and 36 and deformation thereof which might otherwise result.

A suitable elastomeric material for the mass 30 has been found to be polyurethane material and, in order for this material to handle the loads that can be expected in service, testing has shown that the material should have a hardness of approximately 50 Shore D Scale or harder. It has been found that these loads can approach 200,000 lbs. just prior to derailment of a railroad car. One example of such material is Thiokol's Solithane L-650.

In order to provide the initial depression of the bearing under the preloading condition, the top 40 and bottom 41 of the mass 30 are each outwardly concave to provide a limited amount of material in the perimetral parts 31 and 32 which offers a relatively minor degree of resistance to the initial preloading force in order to obtain the desired overall reduction in height of the side bearing.

The second embodiment shown in FIG. 4 is generally similar to that shown in FIGS. 2 and 3 and similar parts have been given the same reference numeral with 200 added thereto.

In this embodiment, the lower mounting member for the mass 230 is formed as a hot-pressed cup 250 which is welded to the base member 220, as indicated at 251, and which has a spacer plate 252 fitted therein and welded thereto by a weld 253.

The upper wear member is provided by a cap 260 which is the same unit as the cup 250 and which is inverted and fitted over the upper perimetral part 231 of the mass 230 and with a spacer plate 261 fitted therein and welded to the wear member as indicated at 262.

A third embodiment of the invention is shown in FIG. 5 and the same reference numerals are used as in the embodiment of FIG. 3, with 300 added thereto.

In this embodiment, a forged cup 360 is welded to the base member 320, as indicated at 361, and has the upstanding annular flange 362 which receives the spring mass 330 with an identical cup inverted to form a cap wear member 365 with a depending annular flange 366 surrounding the upper perimetral part 331 of the mass 330. The action of this side bearing will be the same as that described with respect to the embodiment of FIGS. 2 and 3.

A further embodiment is shown in FIG. 6 wherein the base member 400 and mass 401 defining the spring section of the side bearing are formed integrally of the same material as the mass 30 of the embodiment of FIGS. 2 and 3, and wherein openings 402 and 403 in the base member are provided with metal sleeves 404 and 405, respectively, through which attaching bolts 14 can extend and which can be tightened against the upper ends of the sleeves. The spring section 401 has the upper perimetral part 410 and a lower perimetral part which is not exposed because of the integral nature thereof with the base member 400, but in effect is at the location of the joint 411 between the section 401 and the base 400. Similarly, the side surface is outwardly concave, as shown at 412, and the top and bottom are outwardly concave, as indicated at 415 and 416.

In the embodiment of FIG. 6, the wear member cap 420 is formed of the same material as the base 400 and spring section 401 and with the addition thereto, in the formulation, of particles of either Teflon on molydisulfide to make the upper surface thereof slippery to facilitate relative movement between such surfaces and the plate 15 depending from the car frame 11.

The embodiment of FIG. 6 provides all of the new results described in connection with the preceding embodiments with the added features of requiring minimal manufacturing steps with the spring section 401 and base 400 being formed as an integral casting of the elastomeric material.

Optionally, a steel ring 425 can be bonded to the interior of the cap 420 as a strengthening rib or retainer to add strength of the cap as shown in the embodiment of FIG. 7.

The preferred embodiment is shown in FIG. 8 and incorporates an integral base and spring section of the hard, elastomeric material similarly to the embodiments of FIGS. 6 and 7. In the embodiment of FIG 8, the base section 500 has a pair of openings, one of which is shown at 501, and which receives a sleeve 502 for attachment to the truck bolster. The spring section 505 is symmetrical and extends upwardly from the base 500 and has a frustoconical shape. This shape provides maximum strength for the side bearing in the area where the spring section 505 joins the base 500 to prevent rollover of the side bearing in use.

In the embodiment of FIG. 8, the initial deflection under preloading is provided by the contouring of the upper surface 508 of the spring section 505, with the central part thereof being flat and with an outer perimetrical part 509 sloping downwardly to the outer perimeter 510 of the spring section. This shaping of the upper surface of the side bearing permits a limited amount of the elastomeric material to compress under the initial deflection forces.

The upper portion of the spring section can have suitable material embedded therein to provide a slippery surface, similarly to the cap 420 of the embodiment of FIG. 6.

The frustoconical shape of the spring section 505 permits outward expansion of the spring section under substantial loading forces without substantial increase in the maximum diameter of the spring section.

In order to reduce the amount of elastomeric material used in forming the side bearing, a low-cost plug 515 of metal or other material can be positioned in a recess formed in the base 500 and extending into the interior of the spring section 505. The exact dimensions of this plug can be designed to limit the maximum deflection of the side bearing under maximum loading conditions by causing the railroad car frame, in effect, to bottom on the plug. This plug would also function as a safety stop to limit tilting of the railroad car frame.

I claim:

1. A preloadable side bearing for positioning between the frame of a railroad car and the truck bolster comprising, a base member attachable to the truck bolster, a shaped mass of hard elastomeric material of a hardness of at least 50 Shore D Scale, extending upwardly from said base with the periphery thereof being predominantly outwardly concave and the ends of said mass are outwardly concave to subject a limited portion of said mass to initial preloading forces, said base extending outwardly from said shaped mass at the lower end thereof, and a wear cap on the upper end of said mass.

2. A preloadable side bearing as defined in claim 1 wherein said elastomeric material is a polyurethane material.

3. A preloadable side bearing as defined in claim 1 wherein said cap is formed of the same material as said mass with particles of another material such as Teflon embedded therein to provide a slippery surface for the wear cap.

4. A preloadable side bearing as defined in claim 1 wherein said base is the the same material as said mass and is integral therewith.

5. A preloadable side bearing for positioning between the frame of a railroad car and the truck bolster comprising, a base member with an upstanding annular flange extending upwardly therefrom, a spring member comprising a shaped one-piece mass of hard elastomeric material of a hardness of approximately 50 Shore D Scale or harder and having a said surface with upper and lower perimetral parts and the lower part fitted within said flange, said side surface being outwardly concave between said upper and lower perimetral parts to permit substantial outward movement of said sidewall between said perimetral parts as caused by compressive depression of said mass with the side wall remaining within the peripheral dimension established by said upper and lower perimetral parts and without substantial radial loading of said flange, the top and bottom of said mass being outwardly concave to provide a limited amount of material in said perimetral parts to permit initial depressive movement of said bearing with an initial preload force, and a wear member in the form of a cap on the top of said mass having a depending flange positioned around said upper perimetral part.

6. In combination with a railroad car having a body and a truck bolster, a side bearing having a base attached to said truck bolster, a frustoconical-shaped integral mass of elastomeric material having a hardness of at least approximately 50 to 90 Shore D Scale integral with and extending upwardly from said base, said base formed integrally at the lower end of said integral mass and having lateral projections extending outwardly of said integral mass for attachment to the truck bolster, and the top of said mass having a shape to cause only a part thereto to be subjected to preloading forces.

7. A side bearing as defined in claim 6 wherein the upper end of said spring section is shaped to permit initial deflection of only the shaped portion of the side bearing upper end under preloading forces.

8. A side bearing as defined in claim 7 wherein a plug member is fitted within the base and spring section to reduce the required amount of elastomer and provide a safety stop for the side bearing.